US007882993B2

(12) United States Patent
McGuire et al.

(10) Patent No.: US 7,882,993 B2
(45) Date of Patent: Feb. 8, 2011

(54) SPARE TIRE TUNED MASS DAMPER

(75) Inventors: Michael E. McGuire, Milford, MI (US);
Wojciech E. Suchta, Richmond Hill
(CA); Shizhong Han, Farmington Hills,
MI (US)

(73) Assignee: **GM Global Technology Operations
LLC**, Detroit, MI (US)

( * ) Notice: Subject to any disclaimer, the term of this
patent is extended or adjusted under 35
U.S.C. 154(b) by 876 days.

(21) Appl. No.: 11/678,755

(22) Filed: Feb. 26, 2007

(65) Prior Publication Data
US 2008/0203120 A1 Aug. 28, 2008

(51) Int. Cl.
*B62D 43/00* (2006.01)
(52) U.S. Cl. .............. 224/42.21; 224/42.12; 224/42.23;
224/42.28
(58) Field of Classification Search .............. 224/42.21,
224/42.23, 42.28, 42.12, 538; 414/463, 464,
414/465, 466; 296/37.2; 248/317
See application file for complete search history.

(56) References Cited

U.S. PATENT DOCUMENTS

| | | | | | |
|---|---|---|---|---|---|
| 1,689,148 | A | * | 10/1928 | McCloud | 414/466 |
| 1,983,767 | A | * | 12/1934 | Mueller | 414/463 |
| 3,544,128 | A | * | 12/1970 | Storm | 280/81.6 |
| 3,547,289 | A | * | 12/1970 | Steele | 414/463 |
| 3,554,415 | A | * | 1/1971 | Woods | 224/491 |
| 3,724,731 | A | * | 4/1973 | Potgieter et al. | 224/42.23 |
| 3,904,093 | A | * | 9/1975 | Hanela | 224/42.21 |
| 3,952,894 | A | * | 4/1976 | Mendez | 414/463 |
| 4,377,366 | A | * | 3/1983 | Hamlyn | 414/466 |
| 4,411,159 | A | * | 10/1983 | Spear et al. | 73/768 |
| 4,492,506 | A | * | 1/1985 | Hoagland et al. | 414/463 |
| 4,711,382 | A | * | 12/1987 | Helterbrand | 224/42.23 |
| 4,718,693 | A | * | 1/1988 | Booher | 280/124.107 |
| 4,884,729 | A | * | 12/1989 | Barkouskie | 224/42.21 |
| 4,964,552 | A | * | 10/1990 | Terwilliger | 224/42.23 |
| 5,022,573 | A | * | 6/1991 | Barkouskie | 224/42.21 |
| 5,197,641 | A | * | 3/1993 | Montgomery, Jr. | 224/42.21 |
| 5,954,246 | A | * | 9/1999 | Golovoy et al. | 224/42.23 |
| 5,993,133 | A | * | 11/1999 | Murray et al. | 414/463 |
| 6,941,802 | B2 | * | 9/2005 | Brown | 73/146 |
| 2006/0108489 | A1 | * | 5/2006 | Hartgers et al. | 248/317 |

FOREIGN PATENT DOCUMENTS

WO 2006044943 A2 4/2006

* cited by examiner

*Primary Examiner*—Nathan J Newhouse
*Assistant Examiner*—Lester L Vanterpool
(74) *Attorney, Agent, or Firm*—Quinn Law Group, PLLC

(57) ABSTRACT

A spare tire tuned mass damper assembly is provided for reducing vehicle vibration or beaming shake that may otherwise be perceptible at the driver interface. The assembly is attachable between a pair of underbody support beams and includes a tire carrier for a spare tire and wheel and a plurality of spring and damper assemblies positioned between the carrier and support beams. The assemblies have at least one leaf spring and bushing, and are selected to provide a predetermined level of vibration modes and modal damping for the assembly. A method is also provided for reducing road vibration in a vehicle having an underbody support structure, including supporting a spare tire carrier using a plurality of spring and damper assemblies configured to absorb and damp an oscillating mode of the support structure to a predetermined level to produce a desired post-damped road response, thereby increasing vehicle ride comfort.

17 Claims, 2 Drawing Sheets

SPARE TIRE TUNED MASS DAMPER

TECHNICAL FIELD

The present invention relates generally to an apparatus and method for reducing vehicle road vibration or beaming shake, and in particular to a spare tire tuned mass damper assembly attachable to a vehicle underbody support structure for reducing beaming shake of the vehicle which may be perceptible to the driver at the driver interface.

BACKGROUND OF THE INVENTION

In a vehicle having a substantially rigid underbody support structure, for example any number of interconnected longitudinal and/or lateral support beams, tubes, and/or rails of the type typically used in a pickup truck or other full-size vehicle frame, the vehicle may be prone to vertical vibration when driven in normal driving conditions. When a full size vehicle such as a pickup truck is driven on a typical residential street or is cruising at a relatively high rate of speed on highway pavement, the driver may perceive or experience this vertical vibration, also known as beaming shake, at the driver interface, such as the driver seat and steering column. Depending on the severity or the amplitude of oscillation, beaming shake may affect ride comfort, and in turn, the driver's overall perception of the vehicle.

The mass or weight of the vehicle and its cargo properly positioned or appended to the vehicle may help to reduce the amplitude of the beaming shake to some extent. However, as the reduction of vehicle weight is often an important vehicle design concern, simply adding additional weight or mass to the vehicle is usually a less than optimal solution. Conventionally, in order to free space within the truck bed or rear cargo area, a spare tire assembly in a full size truck is rigidly attached or fastened to the rear of the vehicle and under the support structure or frame. The spare tire assembly in this instance acts like a dead mass to the vehicle, with an imprecise affect on beaming shake.

SUMMARY OF THE INVENTION

Accordingly, a spare tire tuned mass damper assembly is provided for use with a vehicle having a pair of undercarriage structural support members and a driver interface. The assembly comprises a tire and wheel supported by a tire carrier, and a plurality of spring and damper assemblies mounted between the tire carrier and the support members. The assembly is configured to absorb and damp the vibration of the support members and the vehicle which may otherwise be perceptible to the driver at the driver interface.

In one aspect of the invention, at least one of the spring and damper assemblies includes a leaf spring.

In another aspect of the invention, the spring and damper assembly includes a leaf spring having three ends and configured for attachment to the vehicle underbody support structure at each of the three ends.

In another aspect of the invention, the spring and damper assemblies include a bushing.

In another aspect of the invention, a method is provided for reducing road vibration in a vehicle having an underbody support structure, the method including supporting a spare tire carrier on the underbody support structure using a plurality of spring and damper assemblies configured to absorb and damp an oscillating mode of the support structure to a predetermined level to produce a desired post-damped road response and to thereby increase the vehicle ride comfort.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
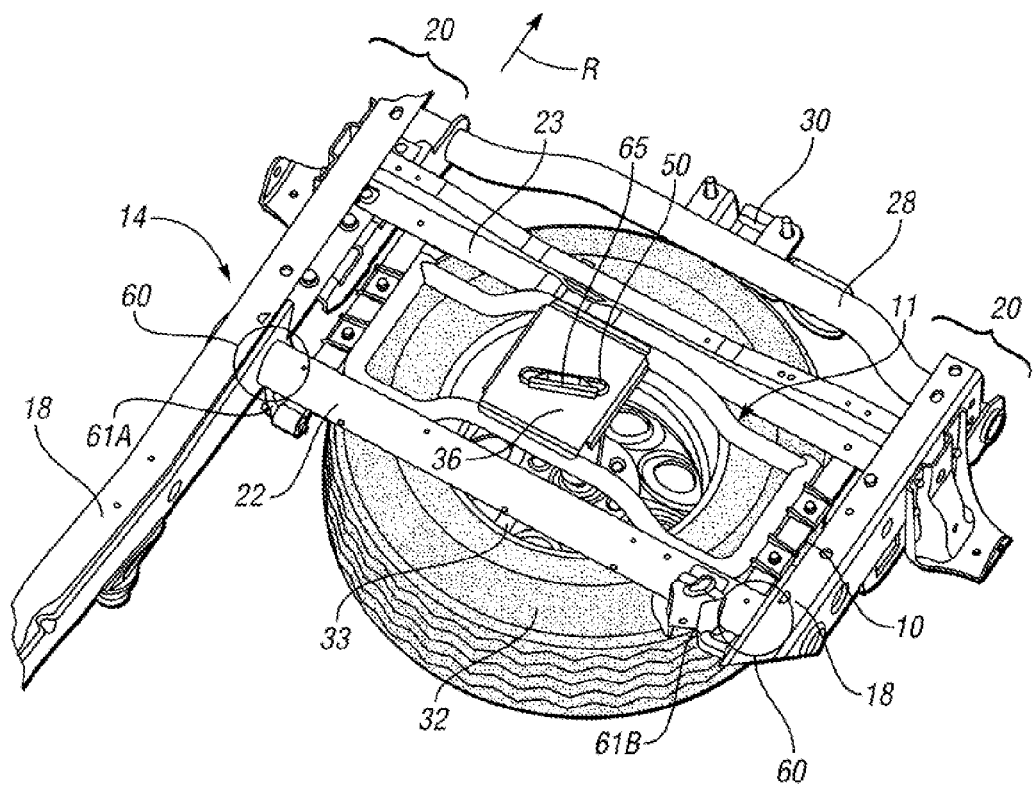
FIG. 1 is a top perspective view of a portion of an underbody vehicle support structure having a pair of side rails, a pair of structural cross-members, and a spare tire tuned mass damper assembly according to the invention.

Referring to the drawings wherein like reference numbers correspond to like or similar components throughout the several figures, there is shown in FIG. 1 a vehicle undercarriage support structure 14 having a tuned mass damper (TMD) spare tire assembly 10 mounted or fastened thereto, and as will be explained in detail later herewithin. The support structure 14 includes a pair of longitudinal support members, tubes, beams, or side rails 18 and a pair of similarly-constructed structural support beams or cross-members 22, 23. As shown in FIG. 1, first cross-member 22 is a tubular-style cross member and second cross-member 23 is a C-channel cross-member, however those skilled in the art will recognize that many styles of cross-member are suitable for providing lateral support between side rails 18 and are therefore useable within the scope of the invention. Support structure 14 has a rear portion 20 positioned in proximity to the rear of the vehicle (arrow R), and is preferably operatively attached to a towing member 28 having a hitch mount 30, with towing member 28 as shown comprised of tubular steel or a size and grade suitable for towing of a load per vehicle specifications.

The TMD spare tire assembly 10 has a tire carrier 11 that is mounted or attached beneath the support structure 14, with the tire carrier 11 being configured to support and transport a spare tire 32 mounted to a wheel 33 in a readily accessible position from the underside of the vehicle (not shown). The spare tire 32 and wheel 33 are preferably a full-size tire and wheel of the style used on or specific for the vehicle, such as per the original equipment manufacturer's specification or sized to match the remaining tires/wheels on the vehicle, to ensure proper vehicle performance. Therefore, the size and strength of the components used to construct the tire carrier 11 should be designed and/or selected accordingly.

Figure 2:
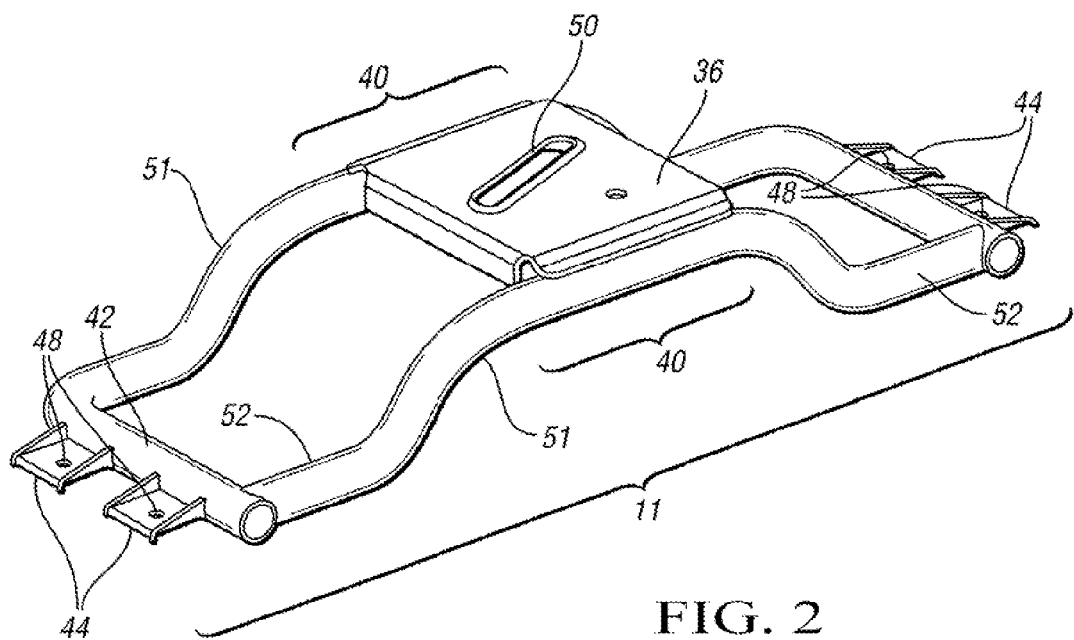
FIG. 2 is a perspective top view of a spare tire carrier useable with the spare tire tuned mass damper assembly of the invention.

Turning to FIG. 2, tire carrier 11 is shown in greater detail from a top perspective, with the support structure 14 removed for simplicity. A pair of curved lateral support tubes 40 are connected together, preferably by a pair of longitudinal support tubes 42 positioned in a perpendicular manner with respect thereto. Tire carrier 11 is constructed with a suitable material such as tubular steel, and has a center 51 disposed between two ends 52, the center 51 being raised or curved to a level above that of ends 52 in order to elevate the spare tire 32 and wheel 33 (see FIG. 1) to a desired level above the road surface. A tire mounting plate 36 spans the distance between and is formed with, welded, bolted, or otherwise attached to each of the lateral support tubes 40 and has a center opening 50 configured to admit a curved bracket 65 (see FIG. 1), threaded vertical rod (not shown), or other device or support mechanism that is operatively attached to the wheel 33, to which is mounted the spare tire 32 (see FIG. 1). One or more tabs or anchors 44 are welded or otherwise attached to each of the longitudinal support tubes 42, with each anchor 44 having a center hole 48 for admitting a bolt or other fastener 46 (see FIG. 3) suitable for mounting the tire carrier 11 within the TMD spare tire assembly 10 (see FIG. 1) of the invention.

As understood by those of ordinary skill in the art, in a classical one-degree-of-freedom vibrating system, dynamic absorption or tuned mass damping involves attaching a secondary mass to the primary vibrating component using a spring. This secondary mass vibrates out of phase with the primary component and applies an inertia force through the spring to oppose the vibrating primary component. The secondary system also absorbs some of the vibration energy associated with the resonance of the primary component.

However, by way of contrast, a vehicle can be understood in terms of a more complex multiple-degree-of-freedom physical system composed of distributed springs, mass, and stiffness. Conventionally, a spare tire assembly in, for example, a full size truck is attached rigidly to the rear of the vehicle and under the support structure and frame. An underbody or undercarriage spare tire assembly under these circumstances acts like a dead weight or mass with respect to the vehicle. Therefore, within the scope of the invention, the dynamic absorber concept as summarized hereinabove is applied to the design of a spare tire tuned mass damper to optimize the effect of the mass of the spare tire assembly on the beaming shake at the driver interface, as will now be described in more detail.

Figure 3:
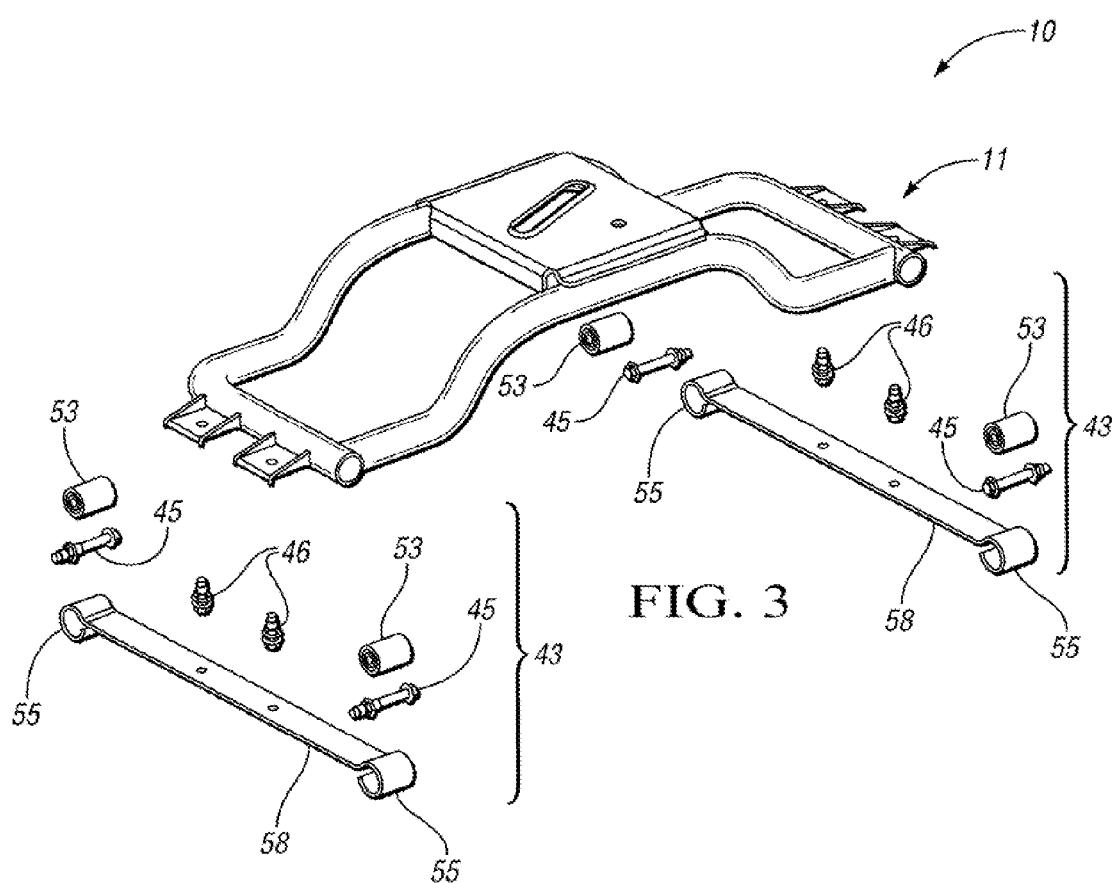
FIG. 3 is an exploded view of a spare tire tuned mass damper assembly according to the invention without the spare tire and wheel.

Turning to FIG. 3, an exploded view of the TMD assembly 10 is shown having a tire carrier 11 as previously described hereinabove, and a pair of spring and damper assemblies 43 disposed beneath the tire carrier 11. The spring and damper assemblies 43 may be any type of component or combination of components suitable for at least partially absorbing and/or damping the vibration and/or oscillation of the support structure 14 to a predetermined level, and preferably includes a pair of supporting leaf springs 58 and bushings 53 as shown in FIG. 3. The leaf springs 58 are preferably made of a lightweight composite material and formed with or operatively connected to a pair of cylindrical ends 55. Cylindrical ends 55 are configured to receive a bushing 53 concentrically therein. A bolt or other fastener 45 is insertable into the bushing 53, the fastener 45 being selected from a corrosion resistant grade of steel or other corrosion-resistant metal suitable for mounting or attaching the TMD assembly 10 to the support structure 14. Preferably, the fastener 45 is attached to a pair of brackets 61A, 61B (see FIG. 1), which are welded or otherwise attached in proximity to a joint 60 formed between each of the side rails 18 and each of the cross-members 22, 23 for added support. While the preferred orientation of leaf springs 58 is laterally between cross-members 22, 23 (see FIG. 1), those skilled in the art will recognize that other orientations are useable within the scope of the invention depending on the packaging space and/or other design requirements. For example, a single longer leaf spring or multi-segmented leaf springs may span the entire distance between side rails 18.

Figure 4:
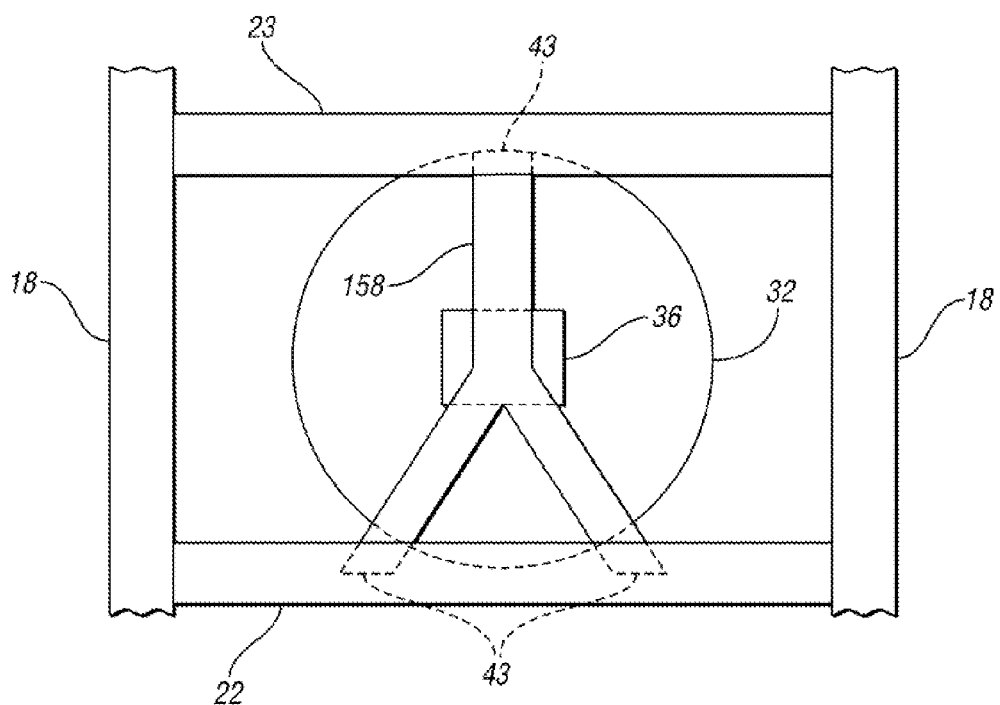
FIG. 4 is a plan view of a three-point spare tire tuned mass damper assembly according to another embodiment of the invention.

In a second embodiment shown in FIG. 4, an alternate three-point leaf spring 158 is shown in a top plan view. For clarity, the tire carrier 11 is omitted except for the mounting plate 36 and tire 32. The three-point leaf spring 158 is mounted to the cross-members 23, 23 between the side rails 18 using a spring and damper assembly 43 such as the preferred leaf spring 58, bushings 53, and brackets 61A, 61B as previously described hereinabove (see FIG. 3), or by using a pin joint (not shown) with bushings 53, or other suitable brackets/mounting mechanisms in conjunction with spring and damper assembly 43. Three-point leaf spring 158 may be a unitary spring as shown in FIG. 4, or may be comprised of multiple connected segments of leaf spring within the scope of the invention.

The material properties of the leaf springs 58, 158 and bushings 53 work in concert to provide adequate passive vibration or oscillation absorption and damping to the vehicle support structure 14 (see FIG. 1) being damped, and as such are selected based on the specific oscillating/beam shake mode characteristics and the pre-damped road response of a given vehicle, i.e., the response of the vehicle under a detected or measured beam mode. A method of reducing road vibration should therefore begin with a basic modal analysis and pre-damped road response of the vehicle structure under the typical operating conditions of that particular vehicle, i.e., a predetermined vehicle speed and/or road surface profiles, or under variable controlled test conditions, as required. The modal analysis may focus on the vibration mode shape and modal frequencies of the spare tire TMD assembly. The properties of the spring and damper assembly 43 of the TMD assembly 10 can then be selected based in part on the basic modal analysis results as well as the pre-damped road response and known mass of the tire carrier 11 (see FIG. 2), spare tire 32, and wheel 33 (see FIG. 1), and in particular on the counteracting effects contributed by the tire carrier 11, spare tire 32, and wheel 33 to the vehicle structure's dynamic behavior or vibration.

Next, the material properties of the spring and damper assembly 43, such as the preferred leaf spring 58, 158 and bushings 53, are selected to provide a predetermined damping profile to dampen the determined oscillating mode to desired level. To this end, leaf springs 58, 158 are preferably constructed or made from composite materials rather than from purely metallic leaf springs, due to the relatively low amount (approximately 1%) of damping that is generally attainable with a purely metal leaf spring. Likewise, rubber or other suitably elastic bushings 53 are preferred for use with the leaf springs 58, 158 due to the relatively high amount (approximately 5-10%) of potential energy absorption and damping attainable therewith. Also, bushings 53 should have an appropriate stiffness ratio, i.e., applied force divided by deflection, along with an appropriately-selected linear and torsional stiffness for a given vehicle. Finally, the tire carrier 11 is supported under the support structure 14 using the plurality of spring and damper assemblies 43 to thereby increase the ride comfort of said vehicle.

While the best modes for carrying out the invention have been described in detail, those familiar with the art to which this invention relates will recognize various alternative designs and embodiments for practicing the invention within the scope of the appended claims.

The invention claimed is:

1. A spare tire tuned mass damper assembly configured for attachment between a pair of underbody support members of a vehicle having a driver interface, the assembly comprising:
   a tire carrier having a mounting plate and a pair of lateral support frames;
   a spare tire mounted to a wheel; and
   a spring and damper assembly mounted between the tire carrier and the underbody support members, the spring and damper assembly including a leaf spring having a pair of cylindrical ends each connectable to a respective one of the pair of underbody support members;

wherein the tire carrier is directly connected to the leaf spring at the pair of lateral support frames and is supported from below by the leaf spring, the tire carrier supporting the spare tire and the wheel from above via the mounting plate, and wherein the spring and damper assembly is sufficiently configured to absorb and damp vibration of the support members and of the vehicle.

2. The assembly of claim 1, wherein the leaf spring is constructed of composite material.

3. The assembly of claim 1, wherein the leaf spring is a single leaf spring having three ends each being attachable to the vehicle underbody support structure.

4. The assembly of claim 1, wherein the spring and damper assembly includes a bushing positioned within each of the cylindrical ends.

5. The assembly of claim 4, wherein the bushing is constructed at least partially of rubber.

6. The assembly of claim 1, wherein the support members are selected from the group of longitudinal side rails and lateral cross members.

7. The assembly of claim 1, including a pair of the spring and damper assemblies, wherein the leaf spring of each of the spring and damper assemblies is connected to a different one of the pair of underbody support members and the pair of lateral support frames.

8. A vehicle underbody support structure comprising:
a pair of structural support beams;
a tire carrier having a mounting plate and a pair of lateral support frames;
a spare tire suspended from above by the pair of support frames via the mounting plate on one side of the pair of support frames of the tire carrier; and
a spring and damper assembly having a leaf spring connected to the tire carrier at least one of the pair of support frames, and supporting the tire carrier from below, the leaf spring having a pair of cylindrical ends each directly connected to a respective one of the pair of structural support members;
wherein the spring and damper assembly is operatively attached to the pair of structural support beams and to the pair of lateral support frames and is operable to at least partially absorb and damp the vibration of said beams.

9. The structure of claim 8, wherein the leaf spring is constructed of composite material.

10. The structure of claim 8, wherein the leaf spring is a single leaf spring having three ends each connected to one of the pair of structural support beams.

11. The structure of claim 8, wherein the spring and damper assembly includes a pair of bushings each positioned within a different one of the cylindrical ends.

12. The structure of claim 11, wherein the bushings are at least partially constructed of rubber.

13. The structure of claim 8, wherein the pair of structural support beams includes at least two longitudinally-extending support rails and at least two cross members extending laterally therebetween.

14. The structure of claim 8, including a pair of the spring and damper assemblies, wherein the leaf spring of each of the spring and damper assemblies is connected to a different one of the pair of underbody support members and the pair of lateral support frames.

15. A method of reducing road vibration in a vehicle having an underbody support structure, the method including:
connecting a spare tire carrier, a tire, and a wheel to a leaf spring of a spring and damper assembly, the leaf spring having a pair of cylindrical ends;
supporting the spare tire carrier, the tire, and the wheel from below and beneath the underbody support structure using the leaf spring;
connecting the spring and damper assembly to the underbody support structure at each of the cylindrical ends; and
using the spring and damper assembly to absorb and damp a vibration of the support structure to a predetermined level.

16. The method of claim 15, further comprising using a bushing as at least part of the spring and damper assembly, wherein the bushing is positioned within one of the cylindrical ends of the leaf spring.

17. The method of claim 15, further comprising using, as the leaf spring, a single leaf spring having three ends as part of the spring and damper assembly, wherein each of the three ends is cylindrical and configured for attachment to the underbody support structure.

* * * * *